United States Patent [19]
Bennett

[11] Patent Number: 5,806,725
[45] Date of Patent: Sep. 15, 1998

[54] DISPENSING MACHINE

[75] Inventor: Robert Bennett, Walsall, Great Britain

[73] Assignee: Ishida Co., Ltd., Kyoto, Japan

[21] Appl. No.: 727,675

[22] PCT Filed: Apr. 18, 1995

[86] PCT No.: PCT/GB95/00874

§ 371 Date: Oct. 17, 1996

§ 102(e) Date: Oct. 17, 1996

[87] PCT Pub. No.: WO95/29108

PCT Pub. Date: Nov. 2, 1995

[30] Foreign Application Priority Data

Apr. 20, 1994 [GB] United Kingdom ............... 9407797

[51] Int. Cl.⁶ ........................................... G01F 11/28
[52] U.S. Cl. ..................... 222/503; 222/450; 222/557; 251/212; 137/624.13
[58] Field of Search ........................... 222/450, 504, 222/502, 503, 557; 251/212; 137/624.13

[56] References Cited

U.S. PATENT DOCUMENTS 898,689 9/1908 Sawyer ............................ 222/503
1,032,190 7/1912 Crosby ............................ 222/450
4,703,874 11/1987 Tapperman et al. ............... 222/198

FOREIGN PATENT DOCUMENTS 1 447 279 8/1976 United Kingdom .

*Primary Examiner*—Andres Kashnikow
*Assistant Examiner*—David Deal
*Attorney, Agent, or Firm*—Staas & Halsey

[57] ABSTRACT

A dispensing machine has a passageway for product with an upper inlet for receiving product and a lower outlet for dispensing product, the outlet is provided with a closing means which serves to retain the product within the passageway. The closing means has three blades pivotally mounted for movement in a substantially horizontal plane between a closed position in which the blades engage one another generally centrally of the passageway and an open position in which the blades are separated to allow product to drop out of the outlet, movement of the blades being controlled by a common drive crank with links connecting the blades to the common drive crank.

14 Claims, 3 Drawing Sheets

DISPENSING MACHINE

This invention relates to a dispensing machine and in particular but not exclusively to a dispensing machine for use in the sorting and packaging of products such as small articles of confectionery.

In the collation of products such as confectionery a standard weight of the product is produced by selecting from a series of batches of different weights and discharging the batches down a common chute. This discharge can be irregular.

Conventionally, the product is discharged down a chute into an empty package and to enable the filled package to be removed from that position and replaced by another empty package at the same time as the product is being discharged from the weighing machine down the chute, such a machine is provided with a gate at the bottom of the chute just before the product enters the package. It is known to use a gate in the form of two flaps which are hinged to the chute so as to swing down to open.

This sort of dispensing machine has a finite maximum operating speed. To make a dispensing machine more economic it is important to increase its operating speed.

The conventional machine is provided with a tapered chute and in combination with the gradual opening of the flaps to release the product contained in the chute, the product is released with a pouring action which takes up some time in an operating cycle.

The present invention seeks to overcome all of the above-mentioned disadvantages by providing a dispensing machine with an increased operating rate and a closing means which enables the product in a passageway to exit in a discrete unitary drop, entering the package in one movement.

According to the present invention there is provided a dispensing machine comprising a passageway for product having an upper inlet for receiving product and a lower outlet for dispensing product, said outlet being provided with a closing means which serves to retain the product within the passageway, said closing means having at least two blades pivotally mounted for movement in a substantially horizontal plane between a closed position in which the blades engage one another generally centrally of the passageway and an open position in which the blades are separated to allow product to drop out of the outlet, movement of the blades being controlled by a common actuator, the blades being interconnected so that they are driven in unison between open and closed positions, characterised in that the actuator is a rotary actuator coupled to the blades so that their motion approximates to simple harmonic motion. Movement of the blades may be controlled by a common drive crank with links connecting the blades to the common drive crank.

The passageway is preferably provided with parallel sides which are substantially perpendicular to the closing means. This passageway may be a cylinder or alternatively any other suitable shape that provides a suitable passageway and enables the product to fall discretely into a suitable package.

A further alternative is for the passageway to be provided with sides which diverge downwardly towards the closing means. Such divergence avoids interference of the sides of the passageway with the flow of product from the machine to the package.

The closing means is preferably provided with three blades which in a closed position abut one another along their respective edges and meet at a generally central position. Alternatively the blades may overlap one another. The meeting of the blades at a central position allows the product in the passageway to be dropped into a package in the form of a discrete unitary drop. Alternatively the closing means may be provided with more than three blades which overlap as they close and meet at a central position.

The movement of the blades may be operated by a series of actuator arms, cranks and rotary actuators. The movement of the blades from a repeated open to a closed position approximates to Simple Harmonic Motion (SHM). The smooth and steady acceleration and deceleration inherent in SHM allow a fast operation without great inertia loads. The high speed three stage operation of the blades opening, the product dropping from the passageway into a package and the blades closing increases the speed at which product can be discharged down the passageway and transferred into packages.

Preferably in the open position the blades are clear of the outlet of the passageway. This helps the product to be discharged as a complete unitary drop and ensures that product does not become trapped behind the blades and the passageway sides.

The passageway may be provided with a second closing means above the closing means provided at the outlet. The second closing means allows collated product to be discharged from the passageway between the two closing means whilst at the same time more product is discharged into the chute from a weighing machine in preparation for the next discharge. Thus the second closing means controls the ingress of product into the passageway prior to it being dispensed into a package.

One embodiment of the invention will now be described in detail by way of example only with reference to and as illustrated in the accompanying drawings, in which FIG. 1 is a diagrammatic side view of a dispensing machine in accordance with the invention with some parts not shown;

Figure 1:
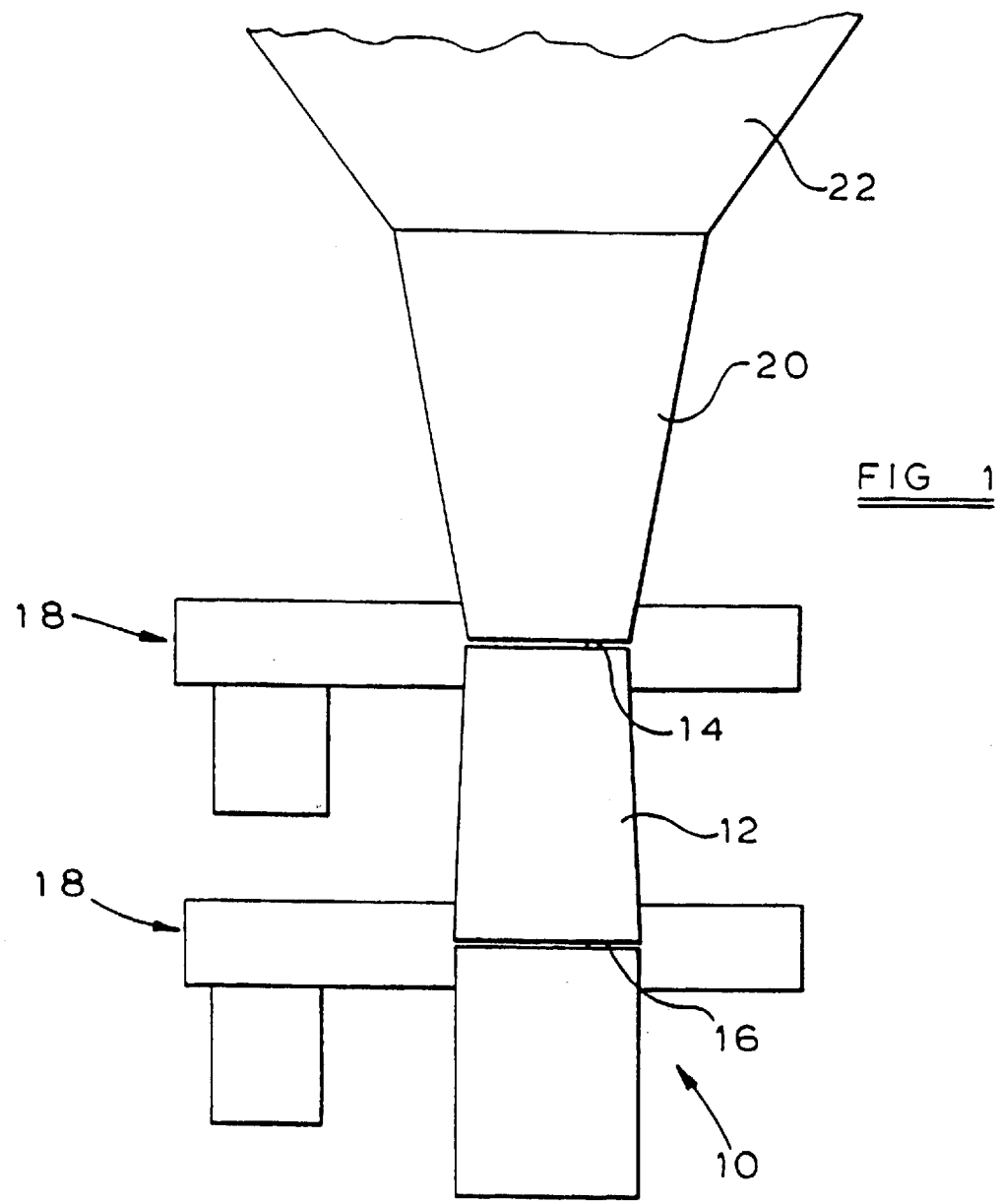
Figure 2:
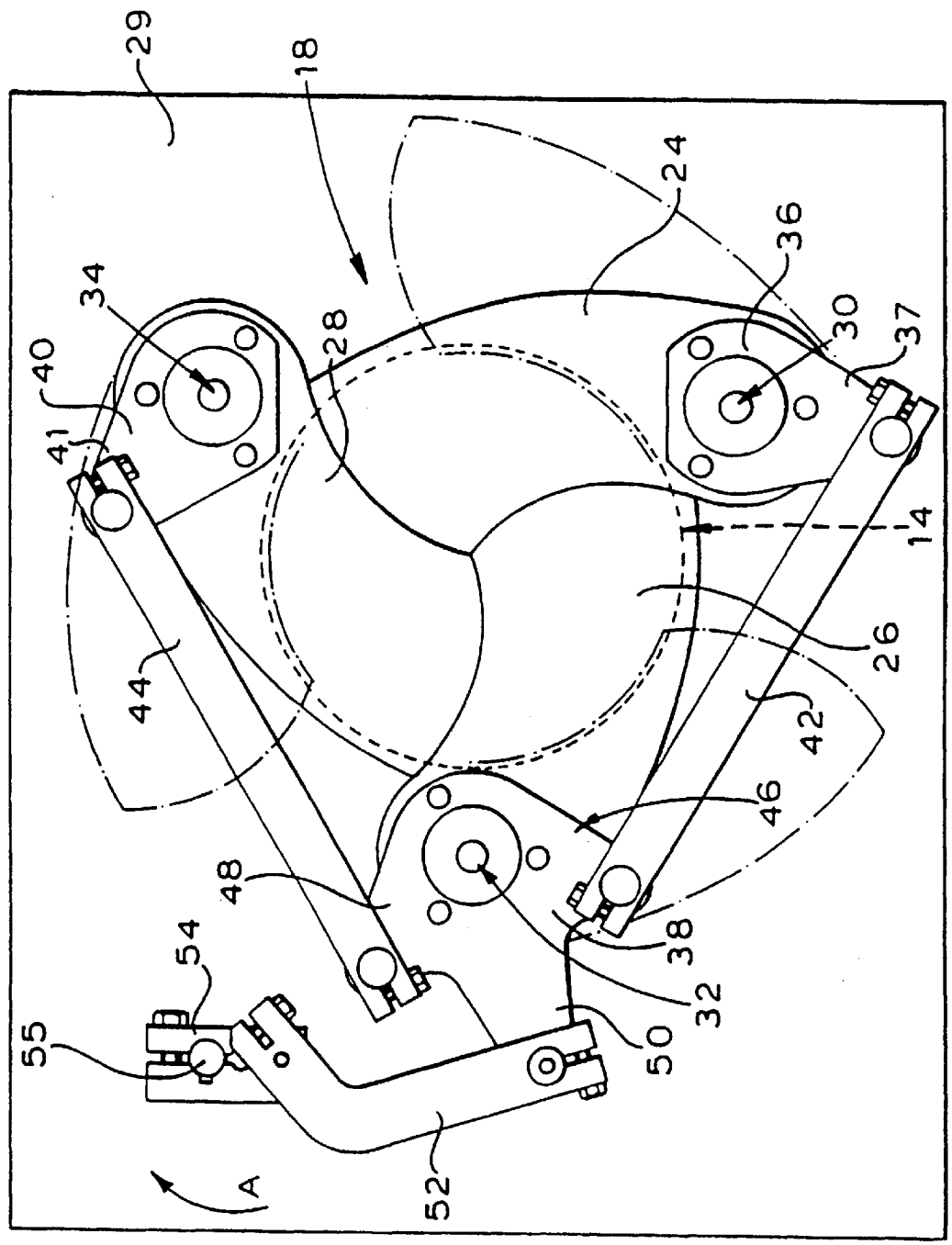
FIG. 2 is an enlarged plan view of a closing means forming part of the dispensing machine of FIG. 1.

FIG. 1 shows a dispensing machine generally designated 10 which consists of a lower collecting chamber in the form of a cylindrical passageway 12 having openings at its respective ends, one opening 14 being disposed above the other and serving as an inlet and the other opening 16 serving as an outlet. Each opening 14 and 16 is provided with a three bladed closing mechanism 18 (as shown in FIG. 2). Mounted directly above the opening 14 is a positively tapered collecting chute 20 which in turn is connected to a discharge chute 22 from a weighing machine (not shown).

FIG. 2 shows the closing mechanism 18 of the dispensing machine described in FIG. 1 as provided at opening 14 and which consists of three identical blades 24, 26 and 28. The blades 24, 26 and 28 are shown in FIG. 2 in a closed position and a dotted outline of the blades is also shown indicating the position of the blades when open. The blades 24, 26 and 28 are pivotally mounted via blade supports 36, 38 and 40 on a base 29 by pivot pins 30, 32 and 34 respectively, the blades 24, 26, 28 being secured to the blade supports 36, 38 and 40 for rotation therewith about the pivot pins 30, 32, 34. Blade support 38 in the form of a double bell crank lever, having a pair of legs 46 and 48 and a central longer leg 50. Blade supports 36 and 40 each have a single leg 37 and 41 respectively. Leg 50 of blade support 38 is pivotally connected to one end of a link 52 the other end of link 52 being pivotally connected to a drive crank 54. Leg 46 of blade support 38 is pivotally connected to one end of a link 42, the other end of which is pivotally connected to leg 37 of blade support 36 and leg 48 of blade support 38 is pivotally connected to one end of a link 44 the other end of which is pivotally connected to leg 41 of blade support 40.

In use the drive crank 54 is rotated 180° by drive shaft 55 from the position illustrated in FIG. 2. Rotation of the crank 54 will move link 52 causing the blade support 38 to rotate clockwise. Movement of blade support 38 is transmitted to blade support 36 via link 42 and to blade support 40 via link 44, causing the blades 24, 26, 28 to be rotated from a closed position (shown in full line in FIG. 2) to an open position (shown in broken line in FIG. 2). To close the blades 24, 26, 28 the drive crank 54 may be driven round a further 180° or back through 180°. back to the position illustrated in FIG. 2.

Driving the blades 24, 26, 28 using a drive crank in the manner disclosed above will impose an approximate Simple Harmonic Motion on the movement of the blades 24, 26, 28. Such movement is both effective and efficient and the smooth and steady acceleration and deceleration inherent in SHM allows a fast operation without great inertia loads.

The drive crank 54 is driven intermittently by drive shaft 55 in order to synchronise the opening and closing of the blades as required. This may be achieved in any suitable manner.

The use of a pair of closing mechanisms 18 at openings 14 and 16 so that the mechanism at opening 14 may be closed while the mechanism at opening 16 is open, ensures separation of successive batches, so that the batches may be delivered cleanly to, for example, packages.

According to one embodiment, metered batches of the product may be delivered to the discharge chute 22. The metered batch will be delivered to the cylindrical passageway 12 via the open mechanism 18 at opening 14 and will remain in the passageway 12 until a package is aligned with the lower end of the chute 22 when the mechanism 18 at the lower opening 16 is opened to discharge the metered batch.

While the metered batch is in the passageway 12 and the mechanism 18 at the lower opening 16 is open, the mechanism 18 at the upper opening 14 is closed thereby preventing the next metered batch from entering the passageway 12.

Figure 3:
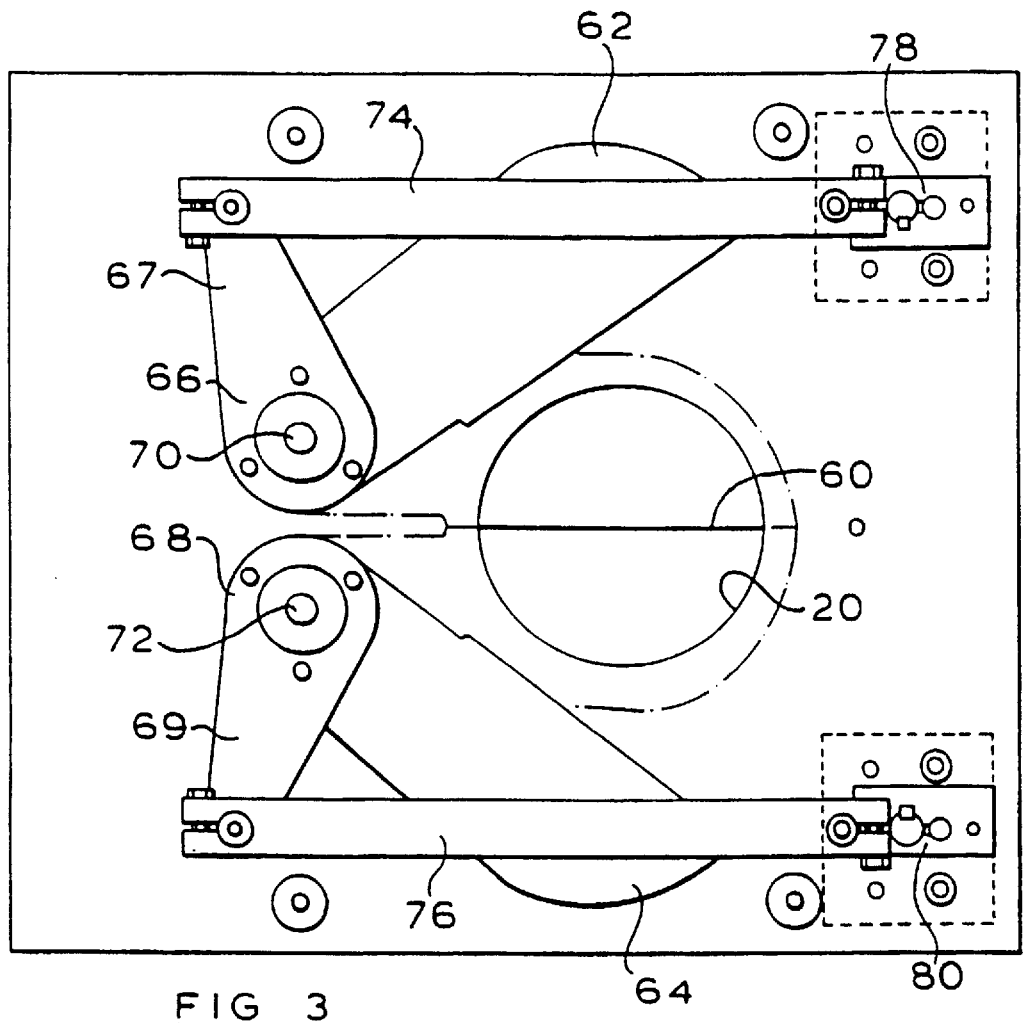
FIG. 3 illustrates in plan view a modification to the dispensing machine illustrated in FIGS. 1 and 2.
Figure 4:
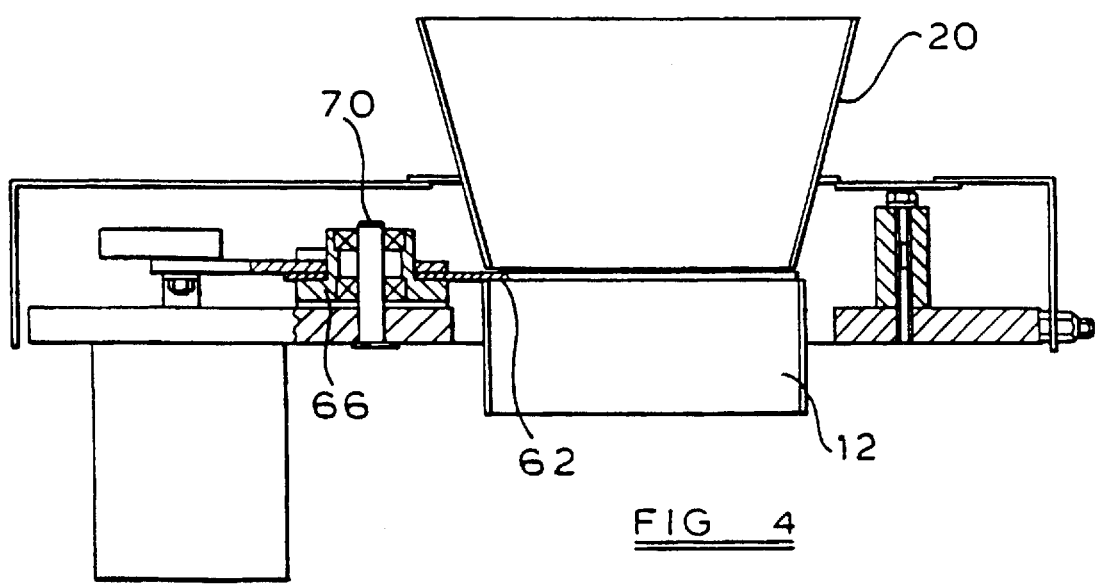
FIG. 4 illustrates in sectional side elevation the modification illustrated in FIG. 3.

In an alternative arrangement, the product may be delivered continuously to the discharge chute 22, the mechanisms 18 at openings 14 and 16 being used to produce gaps in the flow of product, thereby dividing the product into batches which may be packaged individually.

Where the apparatus described above is used to process metered batches of product, the rate of operation of the dispensing machine will be limited by the rate of operation of the metering machine. FIGS. 3 and 4 illustrate a modification to the dispensing apparatus by which the speed of operation of the dispensing machine may be doubled.

In the modification illustrated in FIGS. 3 and 4 the positively tapered 20 collecting chute 20 is divided into two by a transverse wall 60. A pair of metering machines (not shown) are provided upstream of the chute 20, each metering machine being arranged to deliver metered batches of product to one half of the chute 20.

The mechanism 18 at the upper opening 14 is replaced by a pair of blades 62, 64 each blade being mounted on a blade support 66, 68 for movement in a horizontal plane, about pivot pins 70, 72 respectively. The blades 62, 64 are arranged such that in a closed position, each blade 62, 64 closes one half of the chute 20. The blade supports 66, 68 each have a leg 67, 69 by which they are pivotally connected to one end of a link 74, 76, the other ends of the links 74, 76 being connected to a respective one of two intermittently driven drive cranks 78, 80. The drive cranks 78 and 80 drive blades 62 and 64 between open and closed positions in similar manner to the blades 24, 26, 28 of the mechanism 18 described above. Blades 62 and 64 are however driven independently so that batches delivered to the two halves of chute 20 may be alternately delivered to the cylindrical passageway 12 from which they may be dispensed using the mechanism 18 at the lower opening 16.

By using two metering machines in this manner, while the rate of delivery of metered batches from the metering machines may only be for example 90 batches per minute, the dispensing machine may operate at 180batches per minute.

I claim:

1. A dispensing machine comprising a passageway for product having an upper inlet for receiving product and a lower outlet for dispensing product, said outlet being provided with a closing means which serves to retain the product within the passageway, said closing means having at least two blades pivotally mounted for movement in a substantially horizontal plane between a closed position in which the blades engage one another generally centrally of the passageway and an open position in which the blades are separated to allow product to drop out of the outlet, movement of the blades being controlled by a common actuator, the blades being interconnected so that they are driven in unison between open and closed positions, characterized in that the actuator is a rotary actuator coupled to the blades so that their motion approximates to simple harmonic motion.

2. A dispensing machine according to claim 1, wherein movement of the blades is controlled by a common drive crank with links connecting the blades to the common drive crank.

3. A dispensing machine according to claim 1, wherein the passageway is provided with substantially parallel sides which are substantially perpendicular to the closing means.

4. A dispensing machine according to claim 1, wherein the passageway is provided with sides which diverge downwardly towards the closing means.

5. A dispensing machine according to claim 1, wherein the closing means is provided with three blades which in the closed position abut one another along their respective edges and meet at a generally central position.

6. A dispensing machine according to claim 1, wherein the blades of the closing means move along the horizontal plane to an open position at which the blades are clear of the outlet of the passageway.

7. A dispensing machine according to claim 1, wherein the rotary actuator is intermittently driven.

8. A dispensing machine according to claim 7, wherein the rotary actuator is driven through steps of 180°.

9. A dispensing machine according to claim 7, wherein the rotary actuator is driven alternately backwards and forwards.

10. A dispensing machine according to claim 1, wherein the rotary actuator is drivingly connected to one blade, said one blade being drivingly interconnected with the or each of the other blades.

11. A dispensing machine according to claim 1, wherein the passageway incorporates a second closing means above the closing means provided at the outlet.

12. A dispensing machine according to claim 11 including a dispensing station for dispensing material into the passageway via said second closing means, whereby the second closing means controls the ingress of material into the passageway prior to it being dispensed discretely into a package.

13. A dispensing machine according to claim 11, wherein the second closing means is of similar construction to the closing means provided at the outlet.

14. A dispensing machine according to claim 11, wherein said dispensing station includes a chute for conveying material to said second closing means, and said chute is divided into two or more separate passageways, independent second closing means being provided for each passageway.

* * * * *